Dec. 20, 1932.  A. GODEL  1,891,407
ACTIVATION OF CARBONACEOUS SUBSTANCES
Filed Aug. 4, 1930
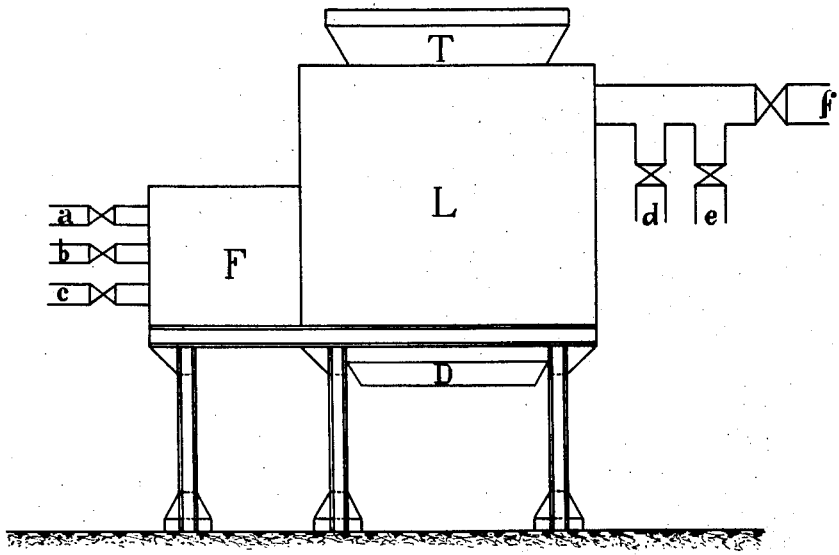

Patented Dec. 20, 1932

1,891,407

UNITED STATES PATENT OFFICE

ALBERT GODEL, OF PARIS, FRANCE, ASSIGNOR TO SOCIETE DE RECHERCHES & D'EXPLOITATIONS PETROLIFERES, OF PARIS, FRANCE

ACTIVATION OF CARBONACEOUS SUBSTANCES

Application filed August 4, 1930, Serial No. 473,012, and in France August 27, 1929.

This invention relates to the activation of carbonaceous materials by means of gases.

It is current practice to treat various carbonaceous materials by means of gases known as activating gases, with a view to converting the said materials into active carbon, that is to say into carbon possessing a high power of absorption for gases or a high decolorizing power.

The carbonaceous materials utilized for this purpose may be raw materials, such as wood or waste of any vegetable or animal materials, peat, lignite, anthracite, and other carbonaceous substances, or the same substances after they have undergone a more or less complete carbonization. There may be added to them suitable chemical substances favoring the activation and they may be agglomerated by various means. The activating gases may be constituted by oxygen, steam, carbon dioxide, chlorine, and hydrochloric acid gas, employed alone or in admixture, diluted in certain cases by combustion gases, carbonization gases, or other neutral gases.

In all the processes in use, the activation is brought about by admitting the above mentioned activating gases over the suitably divided carbonaceous material, in fragments or agglomerates.

This material is raised to a high temperature, the temperature most favorable for the activation depending moreover on the nature of the activating gases and their mode of utilization.

For the carrying out of the activation by gases, there have been proposed numerous processes based upon the three principal modes of operation mentioned below:—

1. The carbonaceous material is enclosed in retorts heated externally to the optimum temperature for the activation. Activating gases are moreover introduced into the interior of these retorts through suitable orifices. The activating gases, which in this case are not admixed with the gases for external heating of the retorts, permit (particularly when using steam or carbon dioxide) of producing retort gases, known as activation gases, by reaction upon the carbonaceous material, these gases being essentially combustible and capable of utilization, if desired for the heating of the retorts.

The drawback of such a process resides in the difficulty of heating the carbonaceous material effectively and very uniformly to the precise temperature necessary for the activation. In fact, the carbonaceous material in its normal condition of employment is generally a very bad conductor of heat; moreover the walls of the retort (necessarily thick for obtaining sufficient strength and gas tightness) are an obstacle to the rapid transmission of the heat. The difficulty of heating is moreover greater inasmuch as the reactions of the activating gases (such as steam and carbon dioxide) upon the carbonaceous materials, which present a certain analogy with the reactions in the manufacture of water gas, are strongly endothermic, and in these conditions it is practically impossible to maintain the same temperature at the center and at the edges of the retort.

In order to overcome the drawbacks mentioned above, recourse is sometimes had to processes of direct heating, constituting the second mode of operation, as follows:—

2. The carbonaceous material, enclosed in retorts, is heated internally and in various ways, in particular by electric currents or more commonly by the introduction of heating gases, such as combustion products into the midst of the carbonaceous material.

The said heating gases may bring about by their simple action the activation of the carbonaceous materials or else in order to accelerate their action, they may be mixed with activating gases such as steam, carbon dioxide, chlorine or hydrochloric acid. The activating and heating gases are introduced into the retorts through suitable apertures. They are transformed, in their passage through the carbonaceous materials, into more or less reducing activation gases, but these gases cannot be employed for combustion in satisfactory conditions, owing to their dilution with the nitrogen contained in the products of combustion. On the other hand, it is rarely possible to maintain the carbonaceous material at a sufficient temperature by the simple passage of heating and activating gases through the mass. Recourse is therefore often had to a supplementary heating from the exterior of the retorts, this constituting the third mode of operation, as follows:—

3. The carbonaceous material is enclosed in retorts heated externally by products of combustion. It is likewise submitted to an internal heating with introduction of activating gases mixed or not with products of combustion. The activiating gases introduced into the retorts may in certain cases be of the same composition as the gases serving for the external heating of the said retorts, for example combustion gases containing carbon dioxide. In other cases these gases may be mixed, the heating gases and the activating gases being admitted together and passed over the carbonaceous material through suitable orifices in the retorts or even through the whole or a part of the surface of the retorts themselves, which in this case present a certain permeability.

It is obvious that in this third mode the drawback still subsists that the retort gases or activation gases being diluted with inert gases cannot be utilized with advantage for combustion.

The present invention, which is an improvement applicable to known processes based on the two last mentioned modes of production of active carbon by means of gases, with internal heating of the retorts, to the exclusion of the first-mentioned mode, in which the heat is applied wholly from the exterior, has for effect to allow the intensification of the activation reactions by a judicious use of the heating gases and the activating gases, gases of different compositions suited to the two objects in view being employed separately in the manner described below and the activating gases being converted into activation gases of high calorific value free from inert diluents.

It is applicable to the activation of any carbonaceous materials, such as wood or waste of any vegetable or animal materials, peat, lignite, anthracite, and other carbonaceous substances, or of the same substances after treatment for carbonization, agglomeration, impregnation and washing, by means of any activating gases, in particular oxygen, steam and/or carbon dioxide, employed alone or in admixture with chlorine or hydrochloric acid gas; the proportions of the gases are preferably such that after reaction upon the carbon in the course of activation they give rise to combustible gases presenting a calorific value high enough to be economically usable, the operation being conducted in retorts or furnaces of any kind suitable for the modes of operation classed in the second and third categories mentioned above.

The present invention comprises an improved mode of operation of an activation furnace or retort, characterized in that the same carbonaceous material is subjected to an alternation of the separate phases of heating and activation, the furnace or retort containing the material being heated internally by heating gases such as combustion products, to bring the material to a temperature suitable for activation, and activating gases of a composition different from that of the heating gases being then passed through the material and producing a fall of temperature, succeeded by further internal heating by gases to raise the temperature for another phase of activation.

In the first phase, that is the heating phase, the furnace or retort containing the carbonaceous material is traversed by combustion gases or residues of combustion, then this heating phase is succeeded by an admission, either in the same direction or in any other direction, through the furnace or retort, of activating gases such as steam, carbon dioxide, chlorine or hydrochloric acid gas. This operation constitutes the second phase or activation phase during which the carbonaceous material cools down slightly owing to the endothermicity of the activation reactions.

When the temperature of the carbonaceous material has been sufficiently lowered for the activation reactions no longer to take place in satisfactory conditions, the activation phase is stopped in order to carry out another heating phase. The carbonaceous material during the time of its stay in the furnace or retorts, which time is determined by the degree of activity to be attained, is thus subjected to a succession of alternate phases of heating and activation, so that its temperature fluctuates over a relatively narrow range between the upper and lower limits of temperature suitable for the activation of the material with the gases employed.

In carrying out the invention, the products of combustion leaving the furnace or retort after heating the material during the heating phase may have added to them if desired small quantities of air in order to secure a total combustion of the combustible constituents which they contain as a result of the reducing action of the carbonaceous materials, after which the sensible heat of these products of combustion is recovered by using them either for the preliminary heating of the activating gases for another furnace, or for the same furnace, or for the production of steam, or for any other purpose.

Also, according to the invention, the activation gases produced during the period of activation which may well be of high calorific value, having regard to the fact that the activating gases can be employed in the pure state, may serve directly by their combustion for the heating of another furnace or of the same furnace during a subsequent phase.

Simply by way of example, there is indicated in outline hereafter a mode of carrying out the invention.

The accompanying drawing represents a general diagram of an activation furnace. It comprises a combustion chamber F connected directly to the working chamber or hearth L of the furnace containing internally a number of retorts or any other devices suitable for receiving the carbonaceous material. The latter is charged or loaded in at the top of the furnace by means of a hopper T leading to the retorts or other containers inside the furnace, and the active carbon obtained is discharged at the bottom in a continuous or a discontinuous manner, at D. The retorts, chambers or other internal containers can be provided with walls presenting suitable apertures or with porous walls as already proposed. These internal containers must be arranged so as to allow of regular heating and also of ready access by the activating gases admitted to the chamber L.

Combustible gases are admitted into the combustion chamber F for the first or heating phase of the operation through a pipe $a$, while air for combustion is admitted through a pipe $b$; the activating gases for the second phase are admitted through a pipe $c$, the three pipes $a\ b\ c$ being each provided with a valve.

The gases leaving the chamber L can be passed either to the chimney through a pipe $d$, or else to suitable apparatus for the utilization of the waste heat through a pipe $e$, or again to a gasometer through a pipe $f$, the three pipes $d\ e\ f$ being likewise each provided with a valve for controlling the flow of the gases according to the phase of the operation.

The operation of the furnace in normal working is as follows:—

During the heating phase, the combustible gases are admitted at $a$ and the air for combustion at $b$, the pipe $c$ being closed. These gases burn in the combustion chamber F and the gases in combustion or the products of combustion traverse the furnace chamber L where they heat up the apertured or porous retorts by external and internal heating, as in the third mode of operation mentioned above. The products of combustion leaving the chamber L then pass either through the pipe $d$ to the chimney, or by pipe $e$ to the apparatus for the recovery of the waste heat. During this phase the valve in the pipe $f$ is closed.

When the heating of the material in the retorts is considered to be sufficient, the heating phase is stopped by closing the valves in the pipes $a$ and $b$, and steam for example (preferably superheated to high temperature) is passed in through the pipe $c$. This steam becomes further superheated as it passes through the combustion chamber F, then it penetrates into the chamber L of the furnace, where it comes into contact with the carbonaceous material by passing through the apertured or porous walls of the retorts which have served for the introduction of the heating gases as explained above. The gases resulting from the activation reactions and constituted by hydrogen and carbon monoxide with a little carbon dioxide are only diluted with a small quantity of steam the nitrogen and other diluents left by the heating gases having been drawn off at the end of the preceding stage. The pipes $d$ and $e$ being shut off, these activation gases are led by the pipe $f$ into a gasometer where they are stored for various usages and in particular for the heating of the furnace during the next heating phase.

When it is judged that the temperature in the working chamber L of the furnace has fallen to or near the lower limit of activation, the activation phase is stopped by closing the valves in the pipes $c$ and $f$ and another heating phase is begun by opening the valves in the pipes $a\ b$ and $d$ or $e$; this alternation of phases is repeated until the material has reached the desired degree of activity.

The present invention is naturally not limited to the diagrammatic furnace described and to the mode of operation defined above, but extends to all modes of operation in which the carbonaceous material is subjected alternately to heating and activating gases.

It is likewise possible, without departing from the scope of the invention, to group together several activation furnaces of the above type, utilizing the combustible gases obtained during the activation phases in certain furnaces for the heating of certain other furnaces, in which the material is at the heating phase of the operation.

It is already known to subject carbonaceous material, generally coke, to alternate phases of heating by combustion of the material with air admitted into the mass and of treatment of the incandescent mass with steam, with the object of producing a rich gas known as "water gas", but in that case the heating is effected at the expense of the coke itself, of which a portion is burnt away at each heating phase, thus heating the remaining part of the material.

But in making water gas, there is no attempt at the production of active carbon, and all the carbonaceous material is consumed inside the apparatus in which it is treated, the main object in view being the production of combustible gas for utilization elsewhere, so that the conditions of operation are the reverse of those obtaining in the activation of carbonaceous materials.

It has likewise been proposed to subject carbonaceous materials in activation furnaces to a succession of treatments such as preheating, distillation, activation, and usually a final calcination, or "burning" stage, but in all these processes the carbonaceous material underwent this sequence of treatments only once in the course of its descent or passage through the furnace, whereas according to the present invention the material is subjected to alternate phases of heating and activation during its stay in the furnace, without being obliged to pass onwards in order to enter a subsequent phase or stage of the process.

It has also been proposed to utilize in tubular retorts alternate phases of heating and activation with the object of activating carbonaceous materials in suspension in the gases, but in that process the heating affected only the walls of the retort which did not contain any carbonaceous material during the time of the reheating stages, whereas in the process according to the present invention it is the carbonaceous material itself which undergoes an alternation of the heating and activation phases during its stay in the furnace.

What I claim is:—

1. In the activation of carbonaceous materials by means of gases, the improvement which consists in treating the carbonaceous material in alternate phases of heating and activation, said heating phase including the heating of the carbonaceous material by gases brought into contact with said material, and said activation phase including the treatment of said material by activating gases, said activating gases being of a composition such that their reaction upon said material yields combustible gases, said combustible gases being burnt with a limited quantity of air and the resulting gases being utilized in connection with a heating phase, and the gases leaving said material during a heating phase being treated to secure the combustion of combustible constituents, the sensible heat developed by said combustion being utilized to preheat said activating gases.

2. A process for the activation of carbonaceous materials by means of gases, comprising the steps of passing heating gases into contact with the carbonaceous material to bring it to a temperature sufficient for activation, passing activating gases of different composition from said heating gases into contact with said material while said material remains above the lower limit of temperature for activation, passing heating gases into contact with said material to bring it back to the upper limit of temperature for activation, and the repetition of said steps of passing heating gases and activating gases alternately into contact with said material, while its temperature fluctuates between said lower and upper limits.

3. A process for the activation of carbonaceous materials by means of gases, comprising the steps of passing heating gases into contact with the carbonaceous material to bring it to a temperature sufficient for activation, passing activating gases of different composition from said heating gases into contact with said material while said material remains above the lower limit of temperature for activation, passing heating gases into contact with said material when its temperature reaches the lower limit for activation to bring it back to a temperature sufficient for activation, and the repetition of said steps of passing heating gases and activating gases alternately into contact with said material, the gases leaving said material being treated to secure the combustion of the combustible constituents, and the sensible heat developed by said combustion being utilized in connection with the process.

4. A process for the activation of carbonaceous materials by means of gases, comprising the steps of passing heating gases into contact with the carbonaceous material to bring it to an upper limit of temperature sufficient for activation, passing activating gases of different composition from said heating gases into contact with said material while said material remains above a lower limit of temperature for activation, passing heating gases into contact with said material to bring it back to said upper limit of temperature sufficient for activation, and the repetition of said steps of passing heating gases and activating gases alternately into contact with said material, said activating gases being of a composition such that their reaction upon said material yields combustible gases, and said combustible gases being utilized in connection with the heating of said material.

5. A process for the activation of carbonaceous materials by means of gases, comprising the steps of passing heating gases into contact with the carbonaceous material to bring it to a temperature sufficient for activation, passing activating gases of different composition from said heating gases into contact with said material while said material remains at a sufficient temperature for activation, passing heating gases into contact with said material to bring it back to a temperature sufficient for activation, and the repetition of said steps of passing heating gases and activating gases alternately into contact with said material, the heating gases leaving said material being treated to secure the combustion of combustible constituents, and the sensible heat developed by said combustion being utilized for the heating of said activating gases and of air serving for the combustion of gases in connection with the process.

In testimony whereof I have affixed my signature.

ALBERT GODEL.